July 28, 1942.  E. W. CLEVELAND  2,291,571
LANDING WHEEL MOUNTING FOR AIRCRAFT
Filed Nov. 12, 1938  2 Sheets-Sheet 1
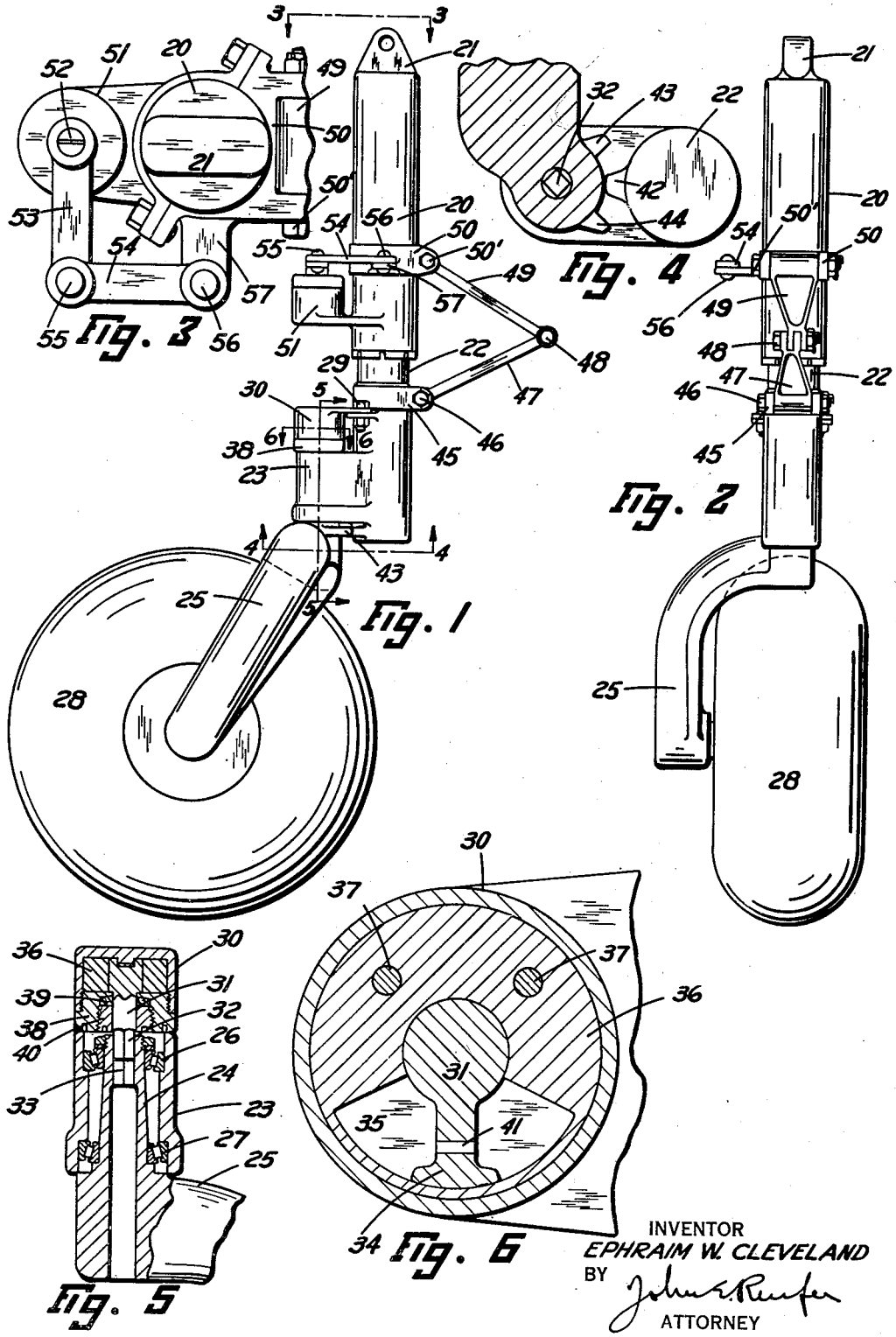
INVENTOR
EPHRAIM W. CLEVELAND
BY
John E. Reufer
ATTORNEY July 28, 1942.  E. W. CLEVELAND  2,291,571
LANDING WHEEL MOUNTING FOR AIRCRAFT
Filed Nov. 12, 1938  2 Sheets-Sheet 2
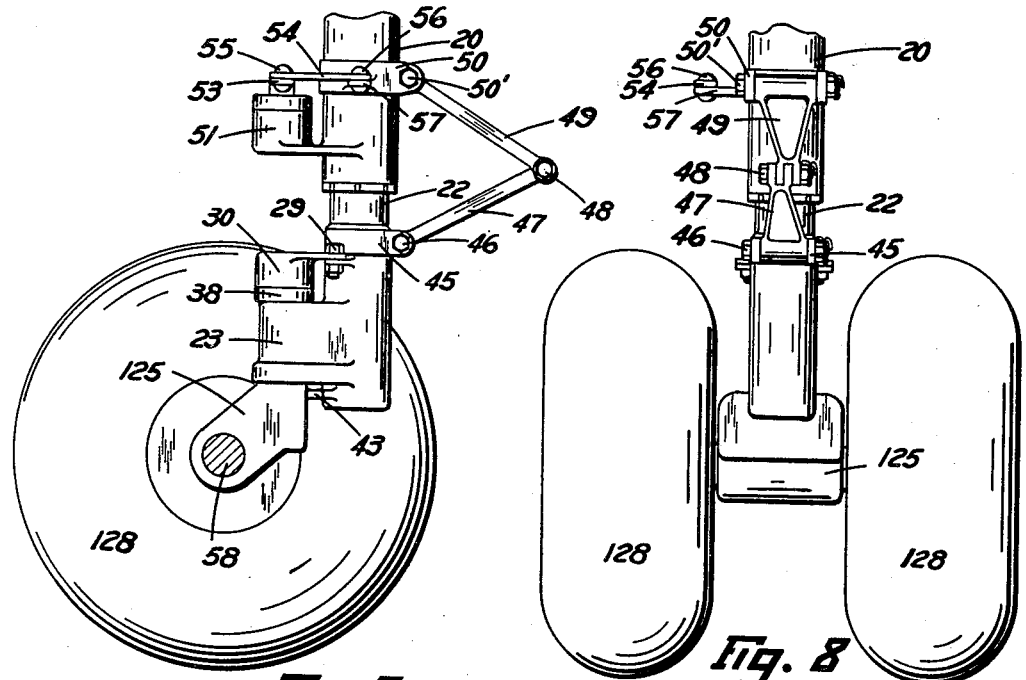
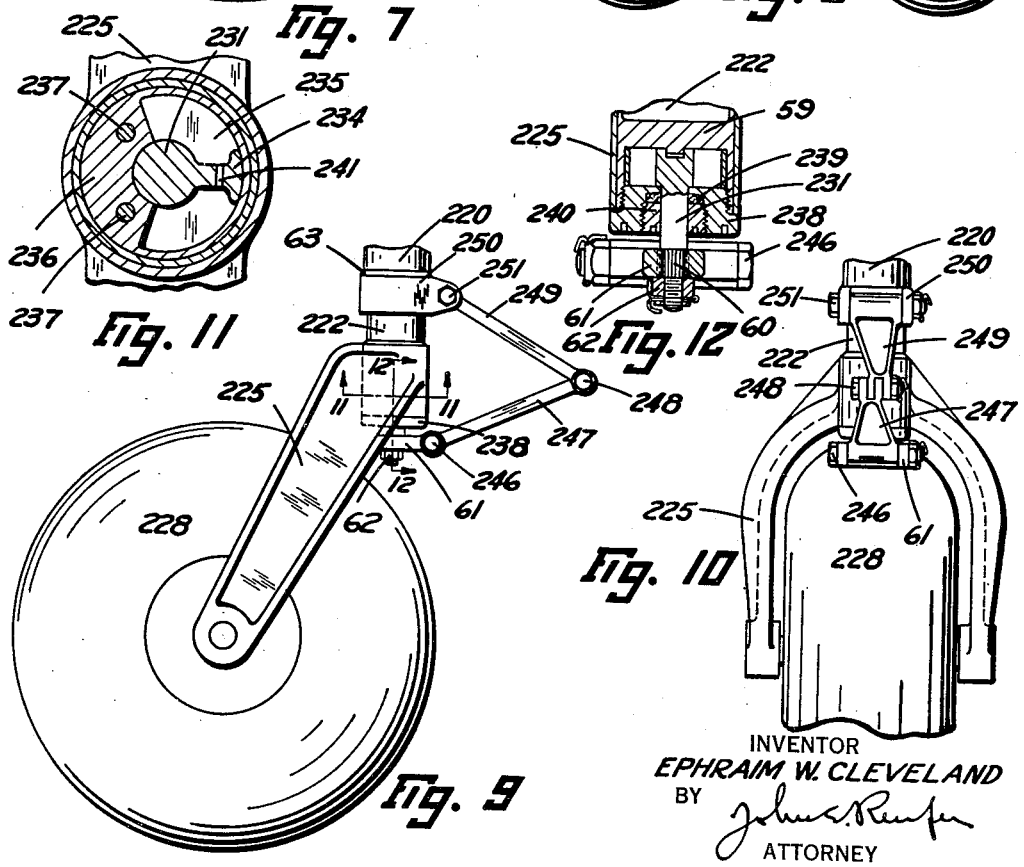
INVENTOR
EPHRAIM W. CLEVELAND
BY
ATTORNEY Patented July 28, 1942

2,291,571

UNITED STATES PATENT OFFICE 2,291,571

LANDING WHEEL MOUNTING FOR AIRCRAFT

Ephraim W. Cleveland, Berea, Ohio, assignor to The Cleveland Pneumatic Tool Company, Cleveland, Ohio, a corporation of Ohio Application November 12, 1938, Serial No. 240,105

3 Claims. (Cl. 244—104)

This invention relates broadly to aircraft, but more particularly to a new and improved nose or tail wheel assembly for use with aircraft.

One object of this invention is to provide a nose or tail wheel assembly of the caster type with means for checking the lateral rotation of the wheel, thereby eliminating oscillations or shimmy of the wheel during landing of the aircraft or when taxiing on the ground, which oscillations have been found to be detrimental to the comfort of the passengers as well as resulting in the premature wear and often breakage of the landing gear.

Another object of this invention is to provide in the assembly of such nose or tail wheel shock absorbing means affording spindle means on which the wheel is capable of snubbed or checked lateral rotation, thereby resulting in a very compact and efficient unit capable of absorbing landing and taxiing shocks as well as preventing lateral oscillations or shimmy of the wheel.

Other objects and advantages more or less ancillary to the foregoing reside in the specific construction and aggroupment of the elements peculiar to the structure, as will become apparent from a more complete examination of this specification.

In the drawings:

Fig. 1 is a side elevational view of a wheel assembly embodying the invention.

Fig. 2 is a front elevational view of the wheel assembly shown in Fig. 1.

Fig. 3 is an enlarged end view of the assembly looking in the direction of the arrows 3—3 in Fig. 1.

Fig 4 is an enlarged cross sectional view taken in the plane indicated by line 4—4 in Fig. 1.

Fig. 5 is an enlarged longitudinal sectional view taken in the plane indicated by line 5—5 in Fig. 1.

Fig. 6 is an enlarged sectional view taken in the plane indicated by line 6—6 in Fig. 1.

Fig. 7 is a fragmental side elevational view of a modification of the invention.

Fig. 8 is a front elevational view of the wheel assembly shown in Fig. 7.

Fig. 9 is a view similar to Fig. 7 showing another modification of the invention.

Fig. 10 is a front elevational view of the assembly shown in Fig. 9.

Fig. 11 is an enlarged cross sectional view taken in a plane indicated by line 11—11 in Fig. 9.

Fig. 12 is an enlarged longitudinal view taken in a plane indicated by line 12—12 in Fig. 9.

Referring to the drawings, 20 represents the outer cylinder of an oleo shock absorber closed at its upper end and provided with a clevis 21 for attachment to the airplane. Slidable within this outer cylinder, there is the usual inner cylinder 22 having its movement relative to the cylinder 20 checked by any suitable means such as the displacement of oil and compressed air stored within the outer cylinder. Since the shock absorber does not in itself form a part of this invention, further description of the same is not thought necessary except than pointing out that the inner cylinder 22 is free to rotate within the outer cylinder 20.

In the construction shown in Figs. 1 to 6 inclusive, the inner cylinder 22 is provided with a boss 23 internally machined to accommodate the spindle 24 of a wheel carrying knuckle 25. As shown in Fig. 5, the spindle 24 is operatively mounted within the boss 23 by means of roller bearings 26 and 27, affording thereby free lateral rotation of a wheel or ground engaging member 28 relative to the cylinder 22.

As shown, the wheel knuckle 25 is offset relative to the spindle 24 to cause trailing of the wheel 28. Rigidly secured to the cylinder 22 by a bolt 29, there is a housing 30 accommodating therein a hydraulic brake or snubbing mechanism which, for the purpose of illustration, is shown to include a center shaft 31 terminated with a square portion 32 located within the corresponding square hole 33 formed through the spindle 24. This shaft has a piston 34 formed integrally therewith and extending laterally thereof for oscillatory movement within a segmental chamber 35 provided within a body member 36 which is rigidly secured to the housing 30 by any suitable means such as pins 37. Below the body member 36, there is provided a suitable stuffing box assembly including a cap 38, packing means 39 affording a seal for the shaft 31, and a gland nut 40 through which compression of the packing 39 may be effected. The chamber 35 is filled with liquid such as castor oil or the like, while the piston 34 has a port 41 extending therethrough for controlling the displacement of the liquid from one to the other side of the piston upon its oscillatory movement. It will be understood that the rotation check or snubber above described is of a well-known commercial type generally referred to as hydraulic snubber, which could well be replaced by any other similar snubber capable of checking rotation of the spindle 24 relative to its housing 23, but enabling its rotation within a predetermined arc of sufficient extent to enable normal turning of the airplane on the ground. In practice this arc has been found to be about 50°, and to prevent the wheel knuckle 25 from accidently swinging beyond the limit of this arc, the lower end of the cylinder 22 is provided with one radially extending lug 42 with which corresponding lugs 43 and 44 formed on the knuckle 25 are capable of engagement to limit the rotation of the wheel knuckle relative to housing 23.

Intermediate its ends, the inner cylinder 22 has rigidly secured thereon a bracket 45 on which is pivotally mounted by means of a cross pin 46 on end of the torque arm 47, while its other end is pivotally mounted by a cross pin 48 to the corresponding end of another torque arm 49 which has its outer end pivotally secured to a ring 50 by a cross pin 50', which ring is rotatable on the outer cylinder 20. Near its inner end, the outer cylinder 20 has rigidly secured thereon a housing 51 extending upwardly alongside of the cylinder 20, and accommodating therein a brake or snubber similar to the one enclosed within the housing 30. Extending through the upper end of housing 51, there is a central shaft 52 corresponding to the central shaft 31 of the snubber 30. This shaft 52 has rigidly secured thereon one end of a link 53 while the other end is pivotally connected to another link 54 by a pin 55, which link 54 is pivotally connected by a pin 56 to a lug 57 formed on the ring 50.

In the modification shown in Figs. 7 and 8, the construction is substantially the same as that above described except that the wheel knuckle 125 is shaped to carry a cross shaft 58 which projects on both sides of the knuckle to rotatably carry two wheels 128. This type of construction is generally used with larger airplanes than that used with the construction shown in Fig. 1, and its application is generally limited to nose wheel.

In the modification shown in Figs. 9 to 12 inclusive, the wheel knuckle 225 is integrally secured by means of a weld or the like on the lower end portion of the inner cylinder 222, which cylinder is slidably mounted within the outer cylinder 220. Near its outer end, the inner cylinder 222 is closed by a wall 59 and machined to accommodate within its lower end a snubber of the type above described which includes body member 236 rigidly secured to the wall 59 by pins 237. This body member is also formed with a segmental chamber 235 within which is mounted the piston 234 of the shaft 231, which piston has the port 241 provided therethrough.

Screwed within extreme lower end of the cylinder 222, there is a cap 238 through which projects the shaft 231 sealed therein by packing 239 secured in position by the gland nut 240. The lower end portion of the shaft 231 is splined as at 60 to receive a correspondingly splined bracket 61 held in position by a nut 62. To this bracket is pivotally secured by a pin 246 one end of a torque arm 247 having its other end pivotally connected by a cross pin 248 to another torque arm 249, which has its inner end pivotally connected to a ring 250 by a cross pin 251. In this construction the ring 250 is rigidly secured on the outer cylinder 220 by any suitable means such as a weld 63.

In the operation of the mechanism shown in Figs. 1 to 6 inclusive, it will be understood that the outer cylinder 20 is secured to the airplane by the clevis 21 against rotation, and that when landing or taxiing, slidable movement of the inner cylinder 22 relative to the outer cylinder 20 for checking or absorbing the shocks, is permitted due to the pivotal connection of the arms 47 and 49. In the construction shown, the wheel 28 is capable of lateral rotation on two different axes including the center axis of the spindle 24, and the center axis of the inner cylinder 22. In practice that construction has been found advantageous for greatly eliminating the shimmy of the wheel when taxiing on the rough ground, which shimmy is in the present construction further eliminated by the use of the brakes or snubbers located within the housings 30 and 51. In the construction shown in Fig. 1, the lateral forces acting on the wheel 28 are transmitted to the spindle 24 by the wheel knuckle 25, thereby causing the spindle to swing slightly around the center axis of the inner cylinder 22, thus effecting a lateral rotation of this cylinder relative to the outer cylinder 20. The lateral rotation of the spindle 24 relative to the cylinder 22 will also be transmitted to the shaft 31 mounted on the spindle 24 against rotation relative thereto, thereby effecting rotation of the piston 34 within the chamber 35, and causing displacement of the fluid within that chamber from one to the other side of the piston 34 via the port 41. Similarly the rotation of the inner cylinder 22 relative to the outer cylinder 20, which rotation is transmitted to the ring 50 by the torque arms 47 and 49, and from the ring 50 to the shaft 52 by links 54 and 53, will be checked by the displacement of the fluid within the housing 51 from one to the other side of the piston capable of oscillatory movement therein.

From the foregoing, it will be understood that the snubbers 30 and 51 actually act as hydraulic brakes enabling lateral rotation of the wheel 28 at a predetermined rate of speed which may be governed by the size of the port 41 through the piston 34. In practice the port 41 is preferably of a size calculated to prevent rapid oscillation or shimmy of the wheel 28 responsive to slight intermittent lateral forces to which the wheel may be subjected, but enabling its lateral rotation upon forces of greater magnitude which would tend to cause breakage of the wheel and landing gear if the wheel was held against lateral rotation.

In order to prevent ground loop, it has been found desirable to limit the lateral rotation of the wheel within a predetermined arc. To that end the inner cylinder 22 is provided with a lug 42 engageable with similar lugs 43 and 44 carried by the wheel knuckle 25, thereby enabling the wheel 28 to rotate laterally until one of the lugs 43 or 44 engages with the lug 42.

In the construction shown in Figs. 7 and 8, the lateral rotation of the wheels 128 will also be checked by the snubbers 30 and 51 in the manner above described.

In the construction shown in Figs. 9 to 12 inclusive, the lateral forces acting on the wheel 228 will tend to cause its lateral rotation on the center axis of the inner cylinder 222. In this construction, the shaft 231 of the snubber is held against rotation relative to the outer cylinder 220 by the torque arms 247 and 249. The body member 236 being secured to the inner cylinder 222 by the pin 237 will rotate therewith and consequently with the wheel knuckle 225 relative to the stationary piston 234 formed on the shaft 231. This relative rotation of the body member 236 will be checked by the displacement of the fluid within the chamber 235 from one to the other side of the piston 234 via the piston port 241. In this single spindle construction, since the lateral forces acting on the wheel 248 will tend to cause a more violent shimmy of the wheel than with the construction shown in Fig. 1, it will be necessary for the piston port 241 to be somewhat smaller than the port 41 of the piston 34 above referred to, thereby enabling a slower flow of the liquid from one to the other side of the piston 234 for efficiently checking the oscillatory movement of the wheel 228.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a landing device for aircraft, a shock absorber including a pair of telescoping cylinders one secured to the aircraft and the other extending from the first one toward the ground, a wheel carrying knuckle including a spindle operatively carried by said other cylinder for rotation on an axis parallel to the center axis of said cylinders, and rotation retarding means between said spindle and its carrying cylinder.

2. In a landing device for aircraft, a shock absorber including a pair of substantially vertical cylinders the upper one being secured to the aircraft and the lower one extending from the upper one toward the ground, a wheel carrying knuckle including a spindle operatively carried by the lower cylinder for rotation on an axis parallel to the center axis of said cylinders, and rotation retarding hydraulic means between said spindle and the lower cylinder including a piston element fixed to the spindle and a cylinder element fixed to the lower cylinder having liquid stored therein resisting the rotation of the piston element relative to the cylinder element.

3. In a landing device for aircraft, an oleo shock absorber including two telescoping cylinders capable of relative rotation, a wheel carrying knuckle including a spindle carried by one of said cylinders for rotation on an axis parallel to the center axis of said cylinders, rotation snubbing means extending from one to the other of said cylinders and carried thereby for retarding said relative rotation, and rotation snubbing means extending from said spindle to its carrying cylinder and carried thereby for retarding rotation of said spindle relative to its carrying cylinder.

EPHRAIM W. CLEVELAND.